United States Patent
Novarino et al.

(10) Patent No.: US 11,313,060 B2
(45) Date of Patent: Apr. 26, 2022

(54) NONWOVEN FABRIC AND PROCESS FOR FORMING THE SAME

(71) Applicants: Fitesa Germany GmbH, Peine (DE); Fitesa Sweden AB, Norrköping (SE)

(72) Inventors: Elena Novarino, Peine (DE); Dag Fohlin, Norrköping (SE)

(73) Assignees: FITESA GERMANY GMBH, Peine (DE); FITESA SWEDEN AB, Norrkoping (SE)

( * ) Notice: Subject to any disclaimer, the term of this patent is extended or adjusted under 35 U.S.C. 154(b) by 216 days.

(21) Appl. No.: 16/652,178

(22) PCT Filed: Oct. 2, 2018

(86) PCT No.: PCT/EP2018/076782
§ 371 (c)(1),
(2) Date: Mar. 30, 2020

(87) PCT Pub. No.: WO2019/068704
PCT Pub. Date: Apr. 11, 2019

(65) Prior Publication Data
US 2020/0248347 A1    Aug. 6, 2020

(30) Foreign Application Priority Data
Oct. 3, 2017    (EP) .................................... 17194485

(51) Int. Cl.
*D04H 1/4291* (2012.01)
*B32B 5/02* (2006.01)
(Continued)

(52) U.S. Cl.
CPC ........... *D04H 1/4291* (2013.01); *B32B 5/022* (2013.01); *D04H 1/5412* (2020.05);
(Continued)

(58) Field of Classification Search
CPC ...... D04H 1/4291; D04H 1/541; D04H 3/007; D04H 3/147; D04H 1/5412; D04H 1/5414;
(Continued)

(56) References Cited

U.S. PATENT DOCUMENTS

| 3,965,519 A | 6/1976 | Hermann |
| 4,753,834 A | 6/1988 | Braun et al. |

(Continued)

FOREIGN PATENT DOCUMENTS

| CN | 1663547 | 9/2005 |
| CN | 102822406 | 12/2012 |

(Continued)

OTHER PUBLICATIONS

English translation to Korean Patent Application Publication No. 2012-0034918 to Kim et al. obtained from the European Patent Office website. (Year: 2012).*

(Continued)

*Primary Examiner* — Jeremy R Pierce
(74) *Attorney, Agent, or Firm* — Rimon, P.C.

(57) ABSTRACT

The present invention relates to an elastic nonwoven fabric comprising a nonwoven web that is made of a plurality of fibers, which fibers are bicomponent fibers which each comprise a first component and a second component, wherein the first component is present in an amount in the range of from 80-95% by weight and the second component is present in an amount in the range of from 5-20% by weight, both weights based on the total weight of each fiber; wherein the first component comprises an ethylene/α-olefin copolymer and the second component comprises a low density polyethylene having a density in the range of from 0.90-0.95 g/cm³ (as determined with ASTM D792); wherein the first component and the second component both have a (Continued)

Figure 1:
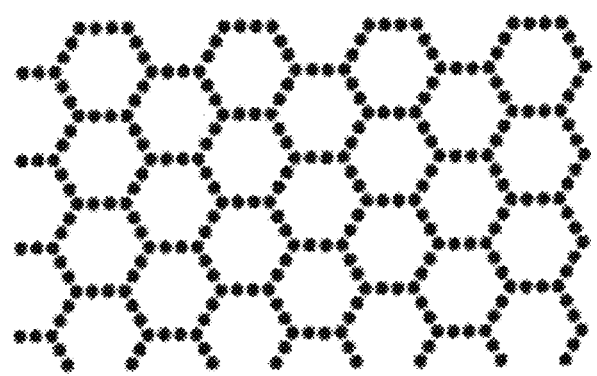

melt flow rate in the range of from 10-40 g/10 min (as determined by ASTM D1238 (190° C., 2.16 kg)); and wherein the nonwoven web comprises a side which is provided with a pattern of individualized bonded areas, wherein the surface of the bonded areas is in the range of 8-25%, based on the total surface of the side. The present invention further relates to a process for preparing the nonwoven fabric, and an article comprising the nonwoven fabric.

13 Claims, 2 Drawing Sheets

(51) Int. Cl.
  *D04H 1/541* (2012.01)
  *D04H 1/559* (2012.01)
  *D04H 3/007* (2012.01)
(52) U.S. Cl.
  CPC ....... *B32B 2307/51* (2013.01); *B32B 2555/02* (2013.01); *D04H 1/5414* (2020.05); *D04H 1/559* (2013.01); *D04H 3/007* (2013.01)
(58) Field of Classification Search
  CPC .... D04H 1/559; B32B 5/022; B32B 2307/51; B32B 2555/02
  See application file for complete search history.

(56) References Cited

U.S. PATENT DOCUMENTS

| | | | |
|---|---|---|---|
| 4,778,460 | A | 10/1988 | Braun et al. |
| 5,817,394 | A | 10/1998 | Alikhan et al. |
| 5,858,515 | A | 1/1999 | Stokes et al. |
| 5,964,742 | A | 10/1999 | McCormack et al. |
| 6,093,665 | A | 7/2000 | Sayovitz et al. |
| 6,821,915 | B2 | 11/2004 | Morman et al. |
| 7,544,628 | B2 | 6/2009 | Stupperich et al. |
| 7,794,442 | B2 | 9/2010 | Roehrl et al. |
| 7,905,871 | B2 | 3/2011 | Mueller et al. |
| 7,972,985 | B2 | 7/2011 | Hirose et al. |
| 7,981,822 | B2 | 7/2011 | Lester, Jr. et al. |
| 8,414,553 | B2 | 4/2013 | Schuehle (Nee Hoffmann) et al. |
| 2003/0119404 | A1 | 6/2003 | Belau et al. |
| 2005/0147785 | A1 | 7/2005 | Ahn et al. |
| 2006/0141886 | A1 | 6/2006 | Brock et al. |
| 2008/0146110 | A1* | 6/2008 | Patel ............... D04H 3/007 442/334 |
| 2010/0040827 | A1 | 2/2010 | Horn et al. |
| 2011/0003524 | A1* | 1/2011 | Claasen ............ D04H 1/492 442/329 |
| 2012/0315440 | A1 | 12/2012 | Chikawa et al. |
| 2014/0187114 | A1 | 7/2014 | Peng et al. |
| 2017/0314171 | A1* | 11/2017 | Abubakar .......... D04H 3/007 |

FOREIGN PATENT DOCUMENTS

| | | |
|---|---|---|
| CN | 103108616 | 5/2013 |
| CN | 302448785 S | 6/2013 |
| DE | 102006044496 | 4/2008 |
| EP | 1035815 B1 | 2/2004 |
| EP | 1369518 B1 | 8/2012 |
| EP | 2605739 A1 | 6/2013 |
| EP | 2849697 A1 | 3/2015 |
| JP | S57167442 A | 10/1982 |
| JP | 2005245913 | 9/2005 |
| JP | 2005245913 A | 9/2005 |
| KR | 20120034918 A | 4/2012 |
| WO | 2005090659 A1 | 9/2005 |
| WO | 2005111291 A1 | 11/2005 |
| WO | 2006048173 A1 | 5/2006 |
| WO | 2008005822 A2 | 1/2008 |
| WO | 2012024576 A1 | 2/2012 |
| WO | 2013173291 A1 | 11/2013 |
| WO | 2015000774 A1 | 1/2015 |

OTHER PUBLICATIONS

International Preliminary Report on Patentability, for International Application No. PCT/EP2018/076782, dated Nov. 13, 2019.
International Search Report and the Written Opinion of the International Searching Authority, or the Declaration, for International Application No. PCT/EP2018/076782, dated Jan. 18, 2019.
Written Opinion, for International Application No. PCT/EP2018/076782, dated Sep. 4, 2019.
Second Written Opinion, for International Application No. PCT/EP2018/076782, dated Oct. 10, 2019.
Office Action for Chinese Application No. 2014800381302 dated Apr. 10, 2018, English Translation only, 7 pages.
Search Report for Chinese Patent Application No. 2014800381302, dated Mar. 30, 2018.
Office Action for European Patent Application No. 14734443.6 dated Sep. 7, 2016, 3 pages.
Design EM000419247-0001, registered Oct. 13, 2005, 3 pages.
Design EM001346910-0013, registered Oct. 15, 2012, 4 pages.
Design EM001346910-0016, registered Oct. 15, 2012, 6 pages.
Design EM002187997-0004, registered Feb. 20, 2013, 3 pages.
Notice of Opposition to European Patent Application No. 14734443.6 dated Apr. 25, 2018 with English Translation, 34 pages.
Notice of Opposition to European Patent Application No. 14734443.6 dated Apr. 26, 2018, 49 pages.
Extended European Search Report for European Patent Application No. 13174693.5 dated Oct. 18, 2013.
Written Opinion issued in International Application No. PCT/EP2014/053474 dated Aug. 6, 2014, 4 pages.
Office Action for European Patent Application No. 14161870.2 dated Sep. 7, 2013, 3 pages.
International Search Report issued in International Application No. PCT/EP2014/063474.
International Preliminary Report on Patentability issued International Application No. PCT/EP2014/063474.

* cited by examiner

NONWOVEN FABRIC AND PROCESS FOR FORMING THE SAME

CROSS REFERENCE TO RELATED APPLICATIONS

The present application is a National Stage application of and claims priority to PCT application PCT/EP2018/076782 filed Oct. 2, 2018 and titled Nonwoven Fabric and Process for Forming the Same, which claims priority benefit to European Patent Application 17194485.3, filed on Oct. 3 2017. The contents of the above referenced applications are incorporated by reference herein their entireties for all purpose.

FIELD OF THE INVENTION

The present invention relates to a nonwoven fabric, in particular an elastic nonwoven fabric, a process for preparing the nonwoven fabric, and an article comprising the non-woven fabric.

BACKGROUND OF THE INVENTION

Nonwoven fabrics are widely applied in disposable medical products, garments, and personal care such as diapers or feminine hygiene products.

Elastic nonwoven fabrics are desirable for use as components in these products because of their ability to conform to irregular shapes and to allow more freedom of body movements than do nonwoven fabrics with limited elasticity.

In U.S. Pat. No. 4,657,802, the production of composite nonwoven elastic webs has been described. The approach disclosed in this document involves forming and stretching an elastic web, then bonding a fibrous gatherable web to the elastic web, and subsequently relaxing the composite so obtained. A disadvantage of this approach is that the final composite needs to be formed in the tensioned state, whereas in addition a bonding step is required.

Another approach is disclosed in US 2003/0207640 wherein a laminate is formed by bonding a nonwoven web to an unmodified film with an adhesive, and the laminate so obtained is subsequently stretched to obtain a breathable web with an elasticity useful for comfort and fit.

Such known process for preparing elastic nonwoven fabrics have, however, the drawback that the stretching and bonding steps require additional equipment and control systems. Moreover, a film or laminate is required, and an adhesive may need to be used.

It is an object of the present invention to provide nonwoven fabrics, which display excellent elasticity properties and which can be produced in a less complicated manner.

SUMMARY OF THE INVENTION

It has now been found that this can be established when a nonwoven fabric is formed of bicomponent fibers which are made of a particular combination of fiber components.

Accordingly, the present invention relates an elastic nonwoven fabric comprising a nonwoven web that is made of a plurality of fibers, which fibers are bicomponent fibers which each comprise a first component and a second component, wherein the first component is present in an amount in the range of from 80-95% by weight and the second component is present in an amount in the range of from 5-20% by weight, both weights based on the total weight of each fiber; wherein the first component comprises an ethylene/α-olefin copolymer and the second component comprises a low density polyethylene having a density in the range of from 0.90 to 0.95 g/cm$^3$ (as determined with ASTM D792); wherein the first component and the second component both have a melt flow rate in the range of from 10-40 g/10 min (as determined with ASTM D1238 (90° C., 2.16 kg)); and wherein the nonwoven web comprises a side which is provided with a pattern of individualized bonded areas, wherein the surface of the bonded areas is in the range of 8-25%, based on the total surface of the side.

Nonwoven webs in accordance with the present invention display an excellent elasticity in terms of both elongation and resilience, they can easily be prepared without additional equipment and controlling systems, whereas in addition no materials such as laminates, films and adhesives are required. Moreover, the nonwoven fabrics display excellent softness and mechanical strength. In addition, the use of two fiber components that comprise ethylene-based polymers, enables a very efficient recycling of the nonwoven fabrics.

It is also an object of the present invention to provide a process for preparing the nonwoven fabric which displays excellent elasticity.

A further object of the present is to provide absorbent articles that comprise the nonwoven fabric which displays excellent elasticity.

DETAILED DESCRIPTION OF THE INVENTION

In accordance with the present invention, the nonwoven fabric comprises a nonwoven web that is made of a plurality of fibers, which fibers are bicomponent fibers which each comprise a first component and a second component. The first component is present in an amount in the range of from 80-95% by weight and the second component is present in an amount in the range of from 5-20% by weight, based on the total weight of each fiber.

Preferably, the first component is present in an amount in the range of from 83-93% by weight and the second component is present in an amount in the range of from 7-17% by weight, based on the total weight of each fiber.

More preferably, the first component is present in an amount in the range of from 86-92% by weight and the second component is present in an amount in the range of from 8-14% by weight, both weights based on the total weight of each fiber.

The first component comprises an ethylene/α-olefin copolymer.

Suitably, the ethylene/α-olefin copolymer is a copolymer of ethylene and a C3-C30 α-olefin. Suitable examples of such α-olefins include propylene, 1-butene, 1-pentene, 1-hexene, 1-octene, 1-heptene, 4-methyl-1-pentene, 4-methyl-1-hexene, 4,4-dimethyl-1-pentene, octadiene, and the like. Preferably, the ethylene/α-olefin copolymer is a copolymer of ethylene and a C4-C10 α-olefin. More preferably, the α-olefin is 1-hexene, 1-octene, 1-heptene or 4-methyl-1-pentene. Most preferably, the ethylene/α-olefin copolymer is a copolymer of ethylene and 1-octene.

In the ethylene/α-olefin copolymer, the amount of α-olefin present is suitably in the range of from 2-70 mole %, based on the total copolymer. Preferably, the amount of α-olefin present is suitably in the range of from 5-50 mole %, more preferably in the range of from 10-40 mole %, based on the total copolymer.

Preferably, the ethylene/α-olefin copolymer is an ethylene/α-olefin block copolymer. In the block copolymer, the comonomer-derived units occur along long sequences.

The ethylene/α-olefin copolymer can suitably be prepared by using a single-site catalyst, e.g. a metallocene catalyst.

Examples of suitable commercially available ethylene/α-olefin copolymers that can be used in accordance with the present invention are for instance INFUSE™ 9817 and INFUSE™ 9807, ethylene/1-octene copolymers that are commercially available from Dow Chemical Company.

The ethylene/α-olefin copolymer has a melt flow rate in the range of from 10-40 g/10 min. Preferably, the ethylene/α-olefin copolymer has a melt flow rate in the range of from 12-35 g/10 min. More preferably, the ethylene/α-olefin copolymer has a melt flow rate in the range of from 15-30 g/10 min. The melt flow rate are determined by ASTM D1238 (190° C.; 2.16 kg)).

The second component comprises a low density polyethylene (LDPE).

Preferably, the polyethylene is a linear low density polyethylene(LLDPE). The second component can suitably be a blend of a low density polyethylene and one or more different polyethylenes such as different low density polyethylenes and/or different linear low density polyethylenes.

The polyethylenes to be used as the second component may be produced from any of the well-known processes, including metallocene and Ziegler-Natta catalyst systems.

The low density polyethylene to be used in accordance with the present invention has a density in the range of from 0.90 to 0.95 g/cm$^3$, suitably in the range of from 0.92 to 0.95 g/cm$^3$, preferably in the range of from 0.93-0.95 g/cm$^3$, more preferably in the range of from 0.93-0.945 g/cm$^3$, and most preferably in the range of from 0.93 to 0.94 g/cm$^3$ (as determined with ASTM D792). Preferably, the low density polyethylene is a linear low density polyethylene having a density in the range of from 0.90 to 0.95 g/cm$^3$, suitably in the range of from 0.92 to 0.95 g/cm$^3$, preferably in the range of from 0.93-0.95 g/cm$^3$, more preferably in the range of from 0.93-0.945 g/cm$^3$. And most preferably in the range of from 0.93 to 0.94 g/cm$^3$ (as determined with ASTM D792). An example of a suitable polyethylene to be used as the second component is ASPUN™ 6000 (a polyethylene polymer resin having a melt index of 19 g/10 min (as determined by ASTM D1238 (190° C., 2.16 kg) and a density of 0.935 g/cm$^3$ (as determined with ASTM D792), available from Dow Chemical Company).

Linear low density polyethylene (LLDPE) which is preferably used as the second component. LLDPE is typically produced by a catalytic solution or fluid bed process under conditions well established in the art. The resulting ethylene polymers are characterized by an essentially linear backbone. Density is controlled by the level of comonomer incorporated into the otherwise linear polymer backbone. Various α-olefins are typically copolymerized with ethylene in producing LLDPE. The α-olefins have preferably four to eight carbon atoms, and may be present in the polyethylene in an amount up to about 10% by weight. The most typical comonomers are 1-butene, 1-hexene, 4-methyl-1-pentene, and 1-octene.

The polyethylene used as the second component has a melt flow rate in the range of from 10-40 g/10 min. Preferably, the polyethylene has a melt flow rate in the range of from 12-35 g/10 min. More preferably, the polyethylene has a melt flow rate in the range of from 15-30 g/10 min. Most preferably, the polyethylene has a melt flow rate in the range of from 15-25 g/10 min. The melt low rates are determined by means of ASTM D1238 (190° C., 2.16 kg).

Suitably, both the first component and the second component have a melt flow rate in the range of from 10-40 g/10 min. Preferably, both the first component and the second component have a melt flow rate in the range of from 12-35 g/10 min. More preferably, both the first component and the second component have a melt flow rate in the range of from 15-30 g/10 min. The melt low rates are determined by means of ASTM D1238 (190° C., 2.16 kg).

The bicomponent fibers in accordance with the present invention may have a side-by-side structure or a core-sheath structure. Preferably, the bicomponent fibers have a core-sheath structure in which the core part comprises the first component and the sheath part comprises the second component.

In a particularly attractive embodiment, the present elastic nonwoven fabric comprises a nonwoven web that is made of a plurality of fibers, which fibers are bicomponent fibers which each comprise a first component and a second component; wherein the first component is present in an amount in the range of from 80-95% by weight and the second component is present in an amount in the range of from 5-20% by weight, both weights based on the total weight of each fiber; wherein the bicomponent fibers have a core-sheath structure in which the core part comprises the first component and the sheath part comprises the second component; wherein the first component comprises an ethylene/1-octene copolymer and the second component comprises a low density polyethylene having a density in the range of from 0.90 to 0.95 g/cm$^3$ (as determined with ASTM D792); wherein the first component has a melt flow rate in the range of from 10-40 g/10 min, preferably in the range of from 12-35 9/10 min (as determined with ASTM D1238 (90° C., 2.16 kg)); wherein the second component has a melt flow rate in the range of from 15-27 g/10 min, preferably in the range of from 15-25 g/10 min, and more preferably in the range of from 15-22 g/10 min (as determined with ASTM D1238 (90° C., 2.16 kg)); and wherein the nonwoven web comprises a side which is provided with a pattern of individualized bonded areas, wherein the surface of the bonded areas is in the range of 8-25%, based on the total surface of the side.

Besides additives already contained in the ethylene/α-olefin copolymer and/or polyethylene, addition of further additives is possible to provide additional properties to the fibers. Suitable further additives include thermal stabilizers, light stabilizers, slip additives, waxes, and additives to make the fabrics either hydrophilic or hydrophobic. The addition of filler materials can sometimes also be of advantage. Suitable filler materials include organic and inorganic filler materials. Suitable examples of inorganic filler materials include minerals such as calcium carbonate, metals such as aluminium and stainless steel. Suitable examples of organic filler materials include sugar-based polymers.

The nonwoven fabrics in accordance with the present invention display an excellent elasticity. The present nonwoven fabric is, upon application of a biasing force, stretchable to more than 200 percent of its relaxed unbiased length, and recovers within a short period of time more than 75 percent of its elongation upon release of the stretching, elongation force. This recovery of more than 75 percent of its elongation applies to both the cross direction and the machine direction of the nonwoven web. At more than 200 percent elongation of the nonwoven fabric, the elongation recovery is preferably more than 78 percent, and more preferably more than 80 percent. With such high elongation recovery ranges, the present nonwoven fabrics can very attractively be used in diapers and sanitary articles because the nonwoven has an excellent ability to conform to the movement of the human body. The extent of elongation recovery can also be expressed in terms of permanent set, wherein the permanent set is defined as the retained elongation in a nonwoven following the elongation and recovery. In the context of the present invention the permanent stretch equals the difference between the final length of the nonwoven fabric after recover and the initial length of the nonwoven fabric (i.e. the strain level), upon stretching a nonwoven fabric to 100 percent elongation. The nonwoven fabric according to the present invention suitably display a permanent set of less than 25%, preferably less than 22%, and more preferably less than 20%. The elongation and elongation recovery are measured by means of a Zwick tensile tester using a hysteresis test, whereas the permanent set is the deformation remaining after a specimen has been stressed in tension for a definite period, and released for a definite period. A standard test piece of known length is stretched by a stated percentage for a period of time and is then released. After recovery, the length is measured and the change in length (i.e. unrecovered length) is expressed as a percentage of the original length (as determined by ASTM D412).

The nonwoven fabrics in accordance with the present invention also display attractive tensile strengths in both the cross direction and the machine direction.

Suitably, the non-woven web according to the present invention has a tensile strength according WSP 110.4 in machine direction in the range of from 0.4-2 N per gram basis weight, preferably in the range of from 0.5-1.9 N per gram basis weight, and more preferably in the range of from 0.6-1.5 N per gram basis weight. Nonwoven webs with such tensile strengths provide non-woven articles with a high tensile strength.

Suitably, the non-woven web according to the present invention has a tensile strength according WSP 110.4 in cross direction in the range of from 0.1-1.5 N per gram basis weight, preferably in the range of from 0.2-1.3 N per gram basis weight, and more preferably in the range of from 0.3-1 N per gram basis weight. Nonwoven webs with such tensile strengths provide non-woven articles with a high tensile strength.

This WSP test method is an internationally acknowledged test method in the nonwoven's industry, as the skilled person will understand.

Preferably, the nonwoven web comprises a side which is provided with a pattern of individualized bonded areas, wherein the surface of the bonded areas is in the range of from 8-25%, more preferably in the range of from 8-15%, and most preferably in the range of from 10-12%, based on the total surface of the side.

Suitably, the nonwoven web has a basis weight in the range of from 5-100 g/m². Preferably, the nonwoven web has a basis weight in the range of from 5-60 g/m², and more preferably the range of from 5-50 g/m².

The bonded areas may have a linear or a non-linear shape. In the context of the present application a non-linear shape is defined as a shape which is not linear as such or does not contain one or more linear parts.

The bonded areas may have a circle, diamond, rectangle, square, oval, triangle, rod, heart, moon star, hexagonal, octagonal or another polygon shape. The pattern of individualized bonded areas may be in various shapes such as a diamond pattern, a hexagonal dot pattern, an oval-elliptic pattern, a rod-shaped pattern or any combination thereof. Suitably, the pattern of individualized bonded areas is a continuous pattern.

Suitably, the pattern of individualized bonded areas defines a pattern of non-bonded areas, whereby the surface of the non-bonded areas is in the range of from 80-92%, preferably in the range of from 85-92%, and more preferably 88-90%, based on the total surface of the side.

The high surface of the non-bonded areas to be used according to the present invention provides an attractively high softness. Moreover, the large non-bonded areas allow for the fiber to bulk up and increase the bulkiness of the fabric. This is perceived as an even higher softness from both visual and the tactile perspective.

Preferably, the side of the non-woven fabric is only provided with the pattern of bonded areas and the pattern of the non-bonded areas, meaning that no further pattern of bonded or non-bonded areas is provided on the side of the non-woven fabric.

Hence, the present invention also relates to an elastic nonwoven fabric comprising a nonwoven web that is made of a plurality of fibers, which fibers are bicomponent fibers which each comprise a first component and a second component, wherein the first component is present in an amount in the range of from 80-95% by weight and the second component is present in an amount in the range of from 5-20% by weight, both weights based on the total weight of each fiber; wherein the first component comprises an ethylene/α-olefin copolymer and the second component comprises low density polyethylene having a density in the range of from 0.90 to 0.95 g/cm³ (as determined with ASTM D792); wherein the first component and the second component both have a melt flow rate in the range of from 10-40 g/10 min (as determined with ASTM D1238 (90° C., 2.16 kg)); and wherein the nonwoven web comprises a side which is provided with an overall pattern which consists of a first pattern and a second pattern, in which the first pattern is a pattern of individualized bonded areas which defines the second pattern of non-bonded areas, and wherein the surface of the bonded areas is in the range of 8-25%, based on the total surface of the side.

In a preferred embodiment of the present invention the non-bonded areas have a hexagonal type of shape.

Accordingly, the present invention also relates an elastic nonwoven fabric comprising a nonwoven web that is made of a plurality of fibers, which fibers are bicomponent fibers which each comprise a first component and a second component, wherein the first component is present in an amount in the range of from 80-95% by weight and the second component is present in an amount in the range of from 5-20% by weight, both weights based on the total weight of each fiber; wherein the first component comprises an ethylene/α-olefin copolymer and the second component comprises a low density polyethylene having a density in the range of from 0.90 to 0.95 g/cm³ (as determined with ASTM D792); wherein the first component and the second component both have a melt flow rate in the range of from 10-40 g/10 min (as determined with ASTM D1238 (90° C., 2.16 kg)); and wherein the nonwoven web comprises a side which is provided with a pattern of individualized bonded areas which bonded areas define a pattern of individualized non-bonded areas which have a hexagonal type of shape, and wherein the surface of the bonded areas is in the range of 8-25%, based on the total surface of the side.

Suitably, the non-bonded areas have the shape of a regular or an irregular hexagon in which one or more sides have a different length. Preferably, the non-bonded areas have a regular hexagonal shape. Suitably, the non-bonded areas have a surface in the range of from 20-50 mm², preferably in the range of from 22-45 mm², and more preferably in the range of from 23-40 mm².

Preferably, the individualized bonded areas that define the pattern of individualized non-bonded areas having a hexagonal shape have a non-linear shape.

In case the individualized bonded areas have a non-linear shape they may suitably have a symmetrical shape such as a circle, diamond, rectangle, square, oval, triangle, heart, moon star, hexagonal, octagonal or another polygon shape. Preferably, the non-linear bonded areas have a circle or hexagonal shape. More preferably, the non-linear bonded areas have a circle shape.

In this preferred embodiment, the bonded areas suitably have a maximum width in the range of from 0.7-1.5 mm, preferably in the range of from 0.75-1.25 mm, and more preferably in the range of from 0.8-1.2 mm.

Suitably, the bonded areas have a surface in the range of from 0.38-1.77 $mm^2$, preferably in the range of from 0.44-1.22 $mm^2$, and more preferably in the range of from 0.50-1.13 $mm^2$.

The discrete non-bonded areas that have a hexagonal type of shape suitably have a depth in the range of from 0.4-1.5 mm, preferably in the range of from 0.4-0.9 mm, more preferably in the range of from 0.4-0.8 mm, and most preferably in the range of from 0.5-0.7 mm.

Suitably, an even number of bonded areas defines an individual non-bonded area that has a hexagonal type of shape. Preferably, the individual non-bonded areas that have a hexagonal type of shape are defined by 6, 12, 18 or 24 individualized bonded areas, more preferably 12, 18 or 24 individualized bonded areas, and most preferably by 12 or 18 individualized bonded areas. In case the individualized non-bonded areas that have a hexagonal type of shape are defined by 12 individualized bonded areas, preferably circle shaped bonded areas, the surface of the bonded areas is in the range of from 8-15%, based on the total surface of the side. In case the individualized non-bonded areas that have a hexagonal type of shape are defined by 18 individualized bonded areas, preferably circle shaped bonded areas, the surface of the bonded areas is in the range of from 12-20%, based on the total surface of the side.

Suitably, such nonwoven fabrics in which the non-bonded areas have a hexagonal shape have a basis weight in the range of from 5-100 $g/m^2$, preferably a basis weight in the range of from 5-60 $g/m^2$, and more preferably in the range of from 5-50 $g/m^2$.

A major advantage of the use of non-bonded area having a hexagonal type of shape resides in the fact that the present pattern is relatively simple to make and it has an improved perceived softness. Moreover, the three-dimensional surface of the non-woven fabric of the present invention provides an aesthetically pleasing appearance for its user. An additional major advantage is the fact that present non-woven fabrics display an improved softness and at the same time a high tensile strength. This is surprising since it is generally acknowledged that softness and dimensional stability (i.e. high tensile strength) of a thermobonded nonwoven fabric are features that mutually exclude each other.

Preferably, the side of the no-woven fabric is only provided with the pattern of the bonded areas and the pattern of the non-bonded areas, meaning that no further pattern of bonded or non-bonded areas is provided on the side of the non-woven fabric.

Therefore, the present invention also relates an elastic nonwoven fabric comprising a nonwoven web that is made of a plurality of fibers, which fibers are bicomponent fibers which each comprise a first component and a second component, wherein the first component is present in an amount in the range of from 80-95% by weight and the second component is present in an amount in the range of from 5-20% by weight, both weights based on the total weight of each fiber; wherein the first component comprises an ethylene/α-olefin copolymer and the second component comprises a low density polyethylene having a density in the range of from 0.90 to 0.95 $g/cm^3$ (as determined with ASTM D792); wherein the first component and the second component both have a melt flow rate in the range of from 10-40 g/10 min (as determined with ASTM D1238 (90° C., 2.16 kg)); and wherein the nonwoven web comprises a side which is provided with an overall pattern which consists of a first pattern and a second pattern, in which the first pattern is a pattern of individualized bonded areas which defines the second pattern of individualized non-bonded areas, and wherein the surface of the bonded areas is in the range of 8-25%, based on the total surface of the side.

In another embodiment the nonwoven web comprises a side with an alternating pattern of individualized bonded areas which have an oval shape.

Accordingly, the present invention also relates an elastic nonwoven fabric comprising a nonwoven web that is made of a plurality of fibers, which fibers are bicomponent fibers which each comprise a first component and a second component, wherein the first component is present in an amount in the range of from 80-95% by weight and the second component is present in an amount in the range of from 5-20% by weight, both weights based on the total weight of each fiber; wherein the first component comprises an ethylene/α-olefin copolymer and the second component comprises a low density polyethylene having a density in the range of from 0.90 to 0.95 $g/cm^3$ (as determined with ASTM D792); wherein the first component and the second component both have a melt flow rate in the range of from 10-40 g/10 min (as determined with ASTM D1238 (90° C., 2.16 kg)); and wherein the nonwoven web comprises a side which is provided with a pattern of individualized bonded areas in the form of ovals, and wherein the surface of the bonded areas is in the range of 8-25%, based on the total surface of the side.

In case the bonded areas are in the shape of ovals, the surface of the bonded areas is preferably in the range of from 12-20% of the total surface area of the side, more preferably in the range of from 14-18% of the total surface area of the side. Suitably, the individualized bonded areas in the form of ovals have a surface in the range of from 0.28-0.40 $mm^2$, preferably in the range of from 0.30-0.38 $mm^2$, and more preferably in the range of from 0.32-0.36 $mm^2$.

The individualized bonded areas which are in the form of ovals may be arranged in any direction of the web. Preferably, the bonded areas in the form of ovals are arranged in such a way as shown in FIG. 2. In this embodiment, adjacent ovals which are arranged in the cross direction form each in turn opposite angels with the machine direction of the web. It will be understood that the cross direction is the direction along the web material substantially perpendicular to the direction of forward travel of the web material through the manufacturing line in which the web material is manufactured (i.e. the machine direction). In FIGS. 1-4, the cross direction runs horizontally, whereas the machine direction runs vertically, as any skilled person will understand.

The ovals can suitably be arranged in such a way that in the machine direction a plurality of uninterrupted regions extend continuously along the web, while in the cross direction no uninterrupted regions exist along the web.

The width of these uninterrupted regions in the cross direction in this preferred arrangement of rods is suitably larger than 300 μm, and preferably the width is in the range of from 500-800 μm.

The ovals suitably have a maximum width in the range of from 350-550 mm, preferably in the range of from 400-500 μm, and more preferably in the range of from 420-480 μm.

The ovals suitably have a maximum length in the range of from 700-1000 μm, preferably in the range of from 800-900 μm, and more preferably in the range of from 820-850 μm.

Suitably, the individualized bonded areas in the form of ovals have a length which is 1.1-2.5 times, preferably 1.5-2.2 times their width.

Suitably, the distance between each pair of adjacent ovals is in the range of from 2.0-4.0 mm, preferably 2.2-3.0 mm in the cross direction.

Suitably, distance between each pair of adjacent ovals is in the range of from 0.9-2.5 mm, preferably 1.2-2.0 mm in the machine direction. Suitably, the alternating pattern consists of the individualized bonded areas which are in the form of ovals. Hence, the alternating pattern does not contain additional bonded areas in addition to the pattern of ovals.

Therefore, the present invention also relates an elastic nonwoven fabric comprising a nonwoven web that is made of a plurality of fibers, which fibers are bicomponent fibers which each comprise a first component and a second component, wherein the first component is present in an amount in the range of from 80-95% by weight and the second component is present in an amount in the range of from 5-20% by weight, both weights based on the total weight of each fiber; wherein the first component comprises an ethylene/α-olefin copolymer and the second component comprises a low density polyethylene having a density in the range of from 0.90 to 0.95 g/cm$^3$ (as determined with ASTM D792); wherein the first component and the second component both have a melt flow rate in the range of from 10-40 g/10 min (as determined with ASTM D1238 (90° C., 2.16 kg)); and wherein the nonwoven web comprises a side which is provided with an overall pattern which consists of a first pattern and a second pattern, in which the first pattern is a pattern of individualized bonded areas in the form of ovals which defines the second pattern of non-bonded areas, and wherein the surface of the bonded areas is in the range of 8-25%, based on the total surface of the side.

In another preferred embodiment accordance with the present invention the nonwoven fabric comprises a plurality of polypropylene-containing fibers that form a nonwoven web which comprises a side which is provided with an alternating pattern of individualized bonded areas which are in the form of rods which are arranged in the cross direction of the web.

Accordingly, the present invention also relates an elastic nonwoven fabric comprising a nonwoven web that is made of a plurality of fibers, which fibers are bicomponent fibers which each comprise a first component and a second component, wherein the first component is present in an amount in the range of from 80-95% by weight and the second component is present in an amount in the range of from 5-20% by weight, both weights based on the total weight of each fiber; wherein the first component comprises an ethylene/α-olefin copolymer and the second component comprises a low density polyethylene having a density in the range of from 0.90 to 0.95 g/cm$^3$ (as determined with ASTM D792); wherein the first component and the second component both have a melt flow rate in the range of from 10-40 g/10 min (as determined with ASTM D1238 (90° C., 2.16 kg)); and wherein the nonwoven web comprises a side which is provided with an alternating pattern of individualized bonded areas which are in the form of rods which are arranged in the cross direction of the web, wherein the surface of the bonded areas is in the range of 8-25%, based on the total surface of the side.

In the context of the present invention the term "rod" is meant to define a linear straight shape such as a straight bar or stick.

The surface of the bonded areas in the form of rods is preferably in the range of from 8-15% of the total surface area of the side, more preferably in the range of from 9-12% of the total surface area of the side.

Preferably, the individualized bonded areas in the form of rods each in their length direction form an angle of 90° with the machine direction of the web.

The rods are preferably arranged in such a way that in the machine direction no uninterrupted regions exist along the web, while in the cross direction the arrangement of the rods define a plurality of uninterrupted regions that extend continuously along the web. Such a preferred arrangement of the rods results in a number of improved fabric properties.

The tensile strength into the cross direction is significantly improved, as the filaments are boldly bound perpendicular to their preferred lay-down direction. It is thereby of importance that no uninterrupted regions in the preferred lay-down direction (i.e. the machine direction) exist, as this would create weak areas of unbonded filaments, resulting in a reduced tensile strength. Moreover, since there are no uninterrupted regions in the machine direction along the web, the free fiber length (i.e. average length of a single fiber between its first and second bond) is comparatively short, resulting in an improved abrasion resistance. Further, this particular arrangement of rods provides uninterrupted non-bonded areas in the cross direction, significantly reducing the bending forces of the fabric and translating into an excellent drapability without sacrificing mechanical strength. This finding is surprising because these two properties usually exclude each other.

The width of these uninterrupted regions in the cross direction in this preferred arrangement of rods is suitably larger than 750 μm, and preferably the width is in the range of from 1000-2000 μm.

The rods may have flat ends and/or bended ends. Preferably, the bended ends have a circular shape. Preferably, the rods have a linear shape.

Suitably, the individualized bonded areas in the form of rods have a surface in the range of from 0.7-1.5 mm$^2$, preferably in the range of from 0.9-1.3 mm$^2$, and more preferably in the range of from 1.1-1.2 mm$^2$.

The elastic nonwoven webs having individualized bonded areas in the form rods suitably have a basis weight in the range of from 5-100 g/m$^2$, preferably in the range of from 5-60 g/m$^2$, more preferably in the range of from 5-50 g/m$^2$, even more preferably in the range of from 8-22 g/m$^2$, and most preferably in the range of from 10-29 g/m$^2$.

The rods suitably have a maximum width in the range of from 0.1-1.2 mm, preferably in the range of from 0.3-0.8 mm, and more preferably in the range of from 0.4-0.6 mm.

The rods suitably have a maximum length in the range of from 1.2-3.5 mm, preferably in the range of from 1.8-3.0 mm, and more preferably in the range of from 2.2-2.6 mm.

Suitably, the individualized bonded areas in the form of rods have a length which is 2-10 times, preferably 2-8 times their width.

The discrete non-bonded areas suitably have a depth in the range of from 0.1-0.8 mm, preferably in the range of from 0.1-0.6 mm, more preferably in the range of from 0.15-0.5 mm, and most preferably in the range of from 0.15-0.4 mm.

Suitably, the distance between each pair of adjacent rods is in the range of from 1.8-3.0 mm, preferably 2.2-2.6 mm in the cross direction.

Suitably, distance between each pair of adjacent rods is in the range of from 2.5-5.0 mm, preferably 3.3-4.2 mm in the machine direction.

In this respect it is observed that the machine direction is the direction along the web material substantially parallel to the direction of forward travel of the web material through the manufacturing line in which the web material is manufactured.

The combination of the particular alternating pattern which consists of individualized bonded areas in the form of rods that are arranged in the cross direction and the high surface of the non-bonded areas to be used according to the present invention provides the surprisingly high softness. Moreover, the large non-bonded areas allow for the fiber to bulk up and increase the bulkiness of the fabric. This is perceived as an even higher softness from both visual and the tactile perspective.

Suitably, the alternating pattern consists of the individualized bonded areas which are in the form of rods. Hence, the alternating pattern does not contain additional bonded areas in addition to the rods which are arranged in the cross direction of the web.

Therefore, the present invention also relates an elastic nonwoven fabric comprising a nonwoven web that is made of a plurality of fibers, which fibers are bicomponent fibers which each comprise a first component and a second component, wherein the first component is present in an amount in the range of from 80-95% by weight and the second component is present in an amount in the range of from 5-20% by weight, both weights based on the total weight of each fiber; wherein the first component comprises an ethylene/α-olefin copolymer and the second component comprises a low density polyethylene having a density in the range of from 0.90 to 0.95 g/cm³ (as determined with ASTM D792); wherein the first component and the second component both have a melt flow rate in the range of from 10-40 g/10 min (as determined with ASTM D1238 (90° C., 2.16 kg)); and wherein the nonwoven web comprises a side which is provided with an overall pattern which consists of a first pattern and a second pattern, in which the first pattern is a pattern of individualized bonded areas in the form of rods which defines the second pattern of non-bonded areas, wherein the surface of the bonded areas is in the range of 8-25%, based on the total surface of the side.

In a particular attractive embodiment of the present invention the nonwoven fabric comprises a nonwoven web which is formed of core-sheath arranged bicomponent fibers in which the core part comprises an ethylene/1-octene copolymer (INFUSE™ 9817, available from Dow Chemical Company) and the sheath part comprises a linear low density polyethylene (ASPUN™ 6000, available from Dow Chemical Company and having a melt index of 19 g/10 min (as determined by ASTM D1238 (190° C., 2.16 kg) and a density of 0.935 g/cm³ (as determined with ASTM D792)). The core part forms 90% by weight and the sheath part forms 10% by weight, based on the total weight of each fiber. The nonwoven web has a side with bonded areas of a circle shape that define non-bonded areas that have a hexagonal type of shape. The bonded area is 11% of the total surface area of the side. This nonwoven fabric displays an attractive permanent set, tensile strength in the cross direction and tensile strength in the machine direction.

In another particularly attractive embodiment of the present invention the nonwoven fabric comprises a nonwoven web which is formed of core-sheath arranged bicomponent fibers in which the core part comprises an ethylene-1-octene copolymer (INFUSE™ 9807, available from Dow Chemical Company) and the sheath part comprises a linear low density polyethylene (ASPUN™ 6000, available from Dow Chemical Company and having a melt index of 19 g/10 min (as determined by ASTM D1238 (190° C., 2.16 kg) and a density of 0.935 g/cm³ (as determined with ASTM D792)).). The core part forms 85% by weight and the sheath part forms 15% by weight, based on the total weight of each fiber. The nonwoven web has a side with bonded areas in the form of CD-rods The bonded area is 11% of the total surface area of the side. Also this nonwoven fabric displays an attractive permanent set, tensile strength in the cross direction and tensile strength in the machine direction.

The bicomponent fibers to be used in accordance with the present invention may in addition contain a slip agent.

The slip agent is suitably added to the polypropylene material during the manufacturing process of the fabric, e.g. in form of a masterbatch during the spinning process.

The slip agent to be used in accordance with the present invention can be any slip agent which can suitably be used in the manufacturing of nonwoven fabrics. Suitably, the slip agent is a hydrocarbon compound that preferably contains heteroatoms which create one or more functional groups, for example, oxygen-containing groups such as hydroxy, alkoxys, carboxy, esters, nitrogen-containing groups such as amines, amides, phosphor-containing functional groups, or silicone-containing functional groups. Moreover, also aryl- and functional aryl groups as well as one or more unsaturated C—C-bonds can suitably be present.

Typical examples of specifically attractive slip agents are for example, polyethylene and polypropylene waxes, primary and secondary amides such as for instance erucamide and oleamide, and stearyl derivatives.

The slip agent is suitably present in an amount in the range of from 0.1-5 wt %, preferably in an amount of 0.5-3 wt %, based on the total weight of the polypropylene-containing fibers.

A round fiber cross-section is preferred. Other suitable fiber cross-sections include for instance ribbon-shaped cross-sections.

The fibers are suitably joined by bonding to form a coherent web structure. Suitable bonding techniques include, but are not limited to, chemical bonding and thermal bonding, for example thermal calendering or bonding by a hot gas stream.

Suitable nonwoven webs may be produced by any of the means known to the art for making a nonwoven. The nonwoven fabrics in accordance with the present invention may be produced by any of the known process for making a nonwoven fabric.

An advantage of the elastic nonwoven fabric in accordance with the present invention is that it can be used alone as a single layer without the need of any any other layer.

The elastic nonwoven fabric may be a single layer or multi-layer nonwoven fabric having, for example, at least one layer of a spunbonded web joined to at least one layer of a meltblown nonwoven web, a carded nonwoven web of staple fibers, or other suitable material. Suitably, the nonwoven fabric according to the present invention comprises in addition a second nonwoven web or the nonwoven fabric is bonded to a laminate The elastic nonwoven webs may be spunbonded webs, meltblown webs, air-laid webs, or carded webs. If the nonwoven web is a web of meltblown fibers, it may include meltblown microfibers.

The fibers can be made according to spinning technologies known in the art. Most conveniently employed are spunbond and meltblown processes, from which the nonwoven fabrics can directly be formed.

Preferably, the nonwoven web in accordance with the present invention is a nonwoven web prepared from spunbond fibers.

Spunbond fibers are generally produced by extruding a molten polymer through a large spinneret having several thousand holes per linear meter or from banks of smaller spinnerets, for example, containing as few as 40 holes. After exiting the spinneret, the molten fibers are quenched by a cross-flow air quench system, then pulled away from the spinneret and attenuated by high speed air. Lay-down of the filaments to create a nonwoven layer occurs on a permeable transport belt. Spunbond fibers are generally continuous and range in fiber diameter between ca. 10-100 μm.

Meltblown fibers on the other hand are generally much smaller in average diameter and usually range between 0.1-4 μm. Additionally, meltblown fibers are considered to be mainly discontinuous.

A meltblowing process is a process in which fibers are formed by extruding a molten thermoplastic material through a plurality of fine, usually circular, die capillaries as molten threads or filaments into a high velocity, usually heated, gas streams which attenuate the filaments of molten thermoplastic material to reduce their diameter. The meltblown process normally has the filaments in single row of filaments across the width of the die. Thereafter, the meltblown fibers are carried by the high velocity gas stream and are deposited on a collecting surface to form a web of randomly dispersed meltblown fibers. Meltblown fibers are microfibers which may be continuous or discontinuous.

The elastic nonwoven fabric in accordance with the invention can additionally be treated to add specific properties. Most common are topical treatments to make the fabric either hydrophilic or to make it hydrophobic. Most common is the treatment of the fabric with either hydrophilic surfactants or with a silicon material. In the context of the present invention a surface of a nonwoven fabric or nonwoven web is "hydrophilic" when the contact angle of water disposed on that surface is less than about 90 and a surface is "hydrophobic" when the contact angle of water disposed on that surface is greater than or equal to 90. Preferably, the nonwoven fabrics in accordance with the invention are hydrophobic non-woven fabrics.

The elastic nonwoven fabric according to the invention can consist of only one type of fibers or fiber layers, e.g. a spunbond web, but it suitably can comprise additional nonwoven webs, which may differ from each other. Suitable multi-layer fabrics may include one or more spunbond layers (S) and meltblown layers (M), such as SMS, SMMS, SSMMS, etc. adhered to a nonwoven fabric according to the present invention. Usually, these multilayer fabrics are made in one step on a single line with multiple beams, which generally encompass a combination of spunbond and meltblown beams. In some cases it might be advantageous or technically necessary to make a multiple layer according to the invention in two or more separate steps.

The use of spunbond layers that differ in their fiber cross-section or in their fiber type are possible.

In case the elastic nonwoven fabric according to the present invention contains an additional nonwoven web, the additional may have a basis weight in the range between 5-80 grams/$m^2$, preferably in the range of from 6-50 grams/$m^2$.

Combination of spunbond layers with natural fibers is possible as well. Preferably, the additional nonwoven webs to be used in accordance with the present invention are made of meltblown fibers.

The present elastic nonwoven fabrics are suitably made from fibers that have a weight in the range of from 1-6 dtex, preferably in the range of from 1.5-5 dtex, and more preferably in the range of from 1.8-4 dtex.

Suitably, the nonwoven webs to be used in accordance with the present invention comprise at most 25 wt % of meltblown fibers, based on total weight of the non-woven web. Preferably, the non-woven webs comprises at most 20 wt % of meltblown fibers, based on the total weight of the non-woven web.

Suitably, the present nonwoven webs contain spunbond fibers only, not mixtures of spunbond fibers and another type of fibers.

The present invention also relates to a process for forming an elastic nonwoven fabric in accordance with the present invention.

Accordingly, the present invention also relates to a process for preparing a spunbond nonwoven fabric according to the present invention, comprising the steps of (a) providing a first stream of a molten or semi-molten ethylene/α-olefin copolymer;

(b) providing a second stream of a molten or semi-molten low density polyethylene having a density in the range of from 0.90 to 0.95 g/$cm^3$ (as determined with ASTM D792), wherein both the ethylene/α-olefin copolymer and the polyethylene have a melt flow rate in the range of from 10-40 g/10 min (as determined with ASTM D1238 (190° C., 2.16 kg);

(c) forming from the first stream and the second stream a plurality of bicomponent fibers which each comprise a first component comprising the ethylene/α-olefin copolymer and a second component comprising the polyethylene, wherein the first component is present in an amount in the range of from 80-95% by weight and the second component is present in an amount in the range of from 5-20% by weight, based on the total weight of each fiber;

(d) forming from the bicomponent fibers as obtained in step (c) a nonwoven web; and (e) feeding the nonwoven web formed in step (d) into a nip defined between oppositely positioned first and second rolls, whereby at least one of the rolls has a patterned outside surface to apply a pattern of individualized bonded areas to the nonwoven web.

In step (c), as a skilled person will understand, use will be made of a spinneret from which molten or semi-molten polymers are extruded into continuous fibers. The continuous fibers will then be quenched, attenuated pneumatically by a high velocity fluid, and collected in random arrangement on a collecting surface. After the fiber collection, any thermal, chemical or mechanical bonding may suitably be applied in step (d) to form a coherent nonwoven web structure. Suitably, hot air by way of hot air knives can be forced through the nonwoven web to soften the outside of the bicomponent fibers so as to form bonds at the intersection of the continuous bicomponent fibers.

The rolls to be used in step (e) in the processes according to the present invention are suitably circular cylinders that can be formed of any suitable, durable material. Such rolls will be operated in ways known in the art.

The locations of the oppositely positioned rolls can suitably be varied to form the nip between the rolls. The nip pressure within nip can suitably be varied depending upon the properties of the one or more nonwoven webs to be processed. The same is true for the necessary temperature of the calender rolls, which has to be adjusted according to the required final properties and the kind of fibers to be bonded.

The bonded areas are suitably formed by means of melt-fusing by controlling the temperature of at least one of the rolls. The temperature of the outer surface of at least one of the rolls can be adjusted by heating or cooling the rolls. The heating and cooling may affect the features of the web(s) being processed and the degree of bonding of single or multiple webs being passed through the nip formed between the respective rolls.

One of the rolls to be used will contain a bonding pattern on its outermost surface comprising a continuous pattern of land areas defining a plurality of discrete openings, apertures or holes. Each of the openings in the one or more rolls will form a discrete unbonded area in at least one side of the nonwoven fabric or nonwoven web. The other roll will suitably have an outer surface which is much smoother than the other roll. Preferably, the outer surface of the other roll will be smooth or flat. The rotational speeds of the respective rolls are substantially identical.

The present invention also relates to an article comprising the nonwoven fabric in accordance with the present invention.

Suitable articles that may comprise the nonwoven fabric according to the present invention include infection control products and a personal care products.

Suitable examples of infection control products include surgical gowns and drapes, face masks, surgical caps and other head coverings, shoe and boot coverings, wound dressings, bandages, sterilization wraps and wipers.

Suitable examples of personal care products include hygiene articles, incontinence articles, diapers, sanitary pads, wipes and fem-care articles.

Preferably, the present elastic nonwoven fabric is used as a waist band, side panel and/or leg cuff of a personal care product such as a diaper or sanitary article.

The article in accordance with the present invention may also suitably be a laminate which comprises an elastic nonwoven fabric according to the present invention that is bonded to another spunbond nonwoven web, a meltblown nonwoven web and/or a carded nonwoven web of staple fibers.

Accordingly, the present invention also relates to a laminate comprising an elastic nonwoven fabric which comprises a nonwoven web that is made of a plurality of fibers, which fibers are bicomponent fibers which each comprise a first component and a second component, wherein the first component is present in an amount in the range of from 80-95% by weight and the second component is present in an amount in the range of from 5-20% by weight, both weights based on the total weight of each fiber; wherein the first component comprises an ethylene/α-olefin copolymer and the second component comprises a low density polyethylene having a density in the range of from 0.90 to 0.95 g/cm$^3$ (as determined by ASTM D792); wherein the first component and the second component both have a melt flow rate in the range of from 10-40 g/10 min (as determined with ASTM D1238 (190° C., 2.16 kg)); wherein the nonwoven web comprises a side which is provided with a pattern of individualized bonded areas, wherein the surface of the bonded areas is in the range of 8-25%, based on the total surface of the side; and wherein the nonwoven fabric is bonded to a spunbond nonwoven web, a meltblown nonwoven web and/or a carded nonwoven web of staple fibers.

Figure 2:
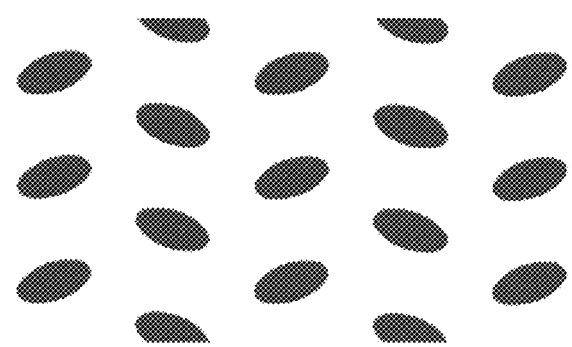

In FIG. 1, a side of a non-woven fabric is shown having a bond pattern which comprises a first and second pattern in accordance with the present invention. The first pattern of individualized bonded areas 1 defines a second pattern of non-bonded areas 2. The individualized bonded areas 1 are in the form of circles and the non-bonded areas 2 have a hexagonal type of shape.

In FIG. 2, a side of a nonwoven fabric is shown having an alternating pattern of individualized bonded areas in the form of ovals.

Figure 3:
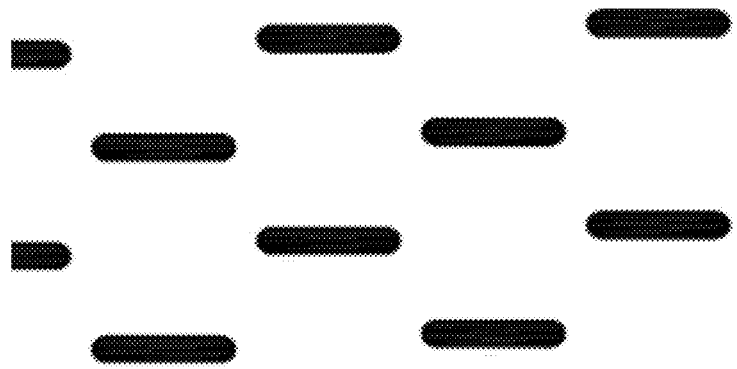

In FIG. 3, a side of a nonwoven fabric is shown having an alternating pattern of individualized bonded areas in the form of rods in the cross direction of the web which define a non-bonded area.

Figure 4:
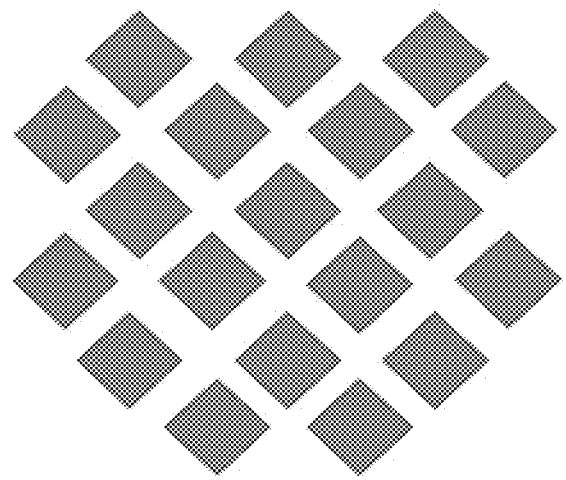

In FIG. 4, a nonwoven fabric is shown having a pattern of individualized bonded areas in the diamonds.

EXAMPLES

In Examples 1 and 2 use has been made of a a Reicofil 3 spunbond pilot line of 1 meter width with a bico core/sheath set-up to manufacture bicomponent fibers having a core/sheath configuration. The line was equipped with an extruder A for the first component (core) and an extruder B for the second component (sheath). Both components were fed to the extruder via hoppers in the corresponding core/sheath ratio, heated to 230° C. and forwarded to the spin pack as two separate streams. The total line throughput was 170 kg/h/m.

The spin pack used was equipped with Hills core/sheath bico plates, consisted of round spinning nozzles having a diameter of 0.6 mm, and 5000 holes per linear meter. The two combined melt streams which formed a core/sheath fibers left the nozzles to enter a quench chamber. The fibers were concomitantly quenched and drawn to fine filaments (quench air temperature is 20° C.), the resulting filaments were collected on a conveyor belt and transported to a calender comprising an upper calender roll carrying a bond pattern and a lower calender roll with a smooth surface to consolidate the filaments via pressure and heat.

In Table 1, a comparison is made between a fabric according to the invention (Example 1) and a fabric which is not in accordance with the invention (Example 2 which is an comparative example).

TABLE 1

| Fabric characteristics and properties | | |
|---|---|---|
| | Example 1 | Example 2 |
| Filament Core/Sheath Rati | 80/20 | 80/20 |
| Core polymer | Infuse 9817 (Dow): metallocene-catalyzed ethylene-1-octene block copolymer (density: 0.879 g/cm3 (ASTM D792); and Melt flow rate: 15 g/10 min (ASTM D1238)) | Versify 4200 (Dow): random propylene-ethylene copolymer (density: 0.876 g/cm3 (ASTM D792); and Melt flow rate: 8 g/10 min (ASTM D1238)) |
| Sheath polymer | Aspun 6000 (Dow): low densiity polyethylene (density: 0.935 g/cm3 (ASTM D792); and Melt flow rate: 19 g/10 min (ASTM D1238)) | Aspun 6850 (Dow): high density polyethylene (density: 0.955 (ASTM D792); and Melt flow rate 30 g/10 min (ASTM D1238)) |

TABLE 1-continued

Fabric characteristics and properties

| | Example 1 | Example 2 |
|---|---|---|
| Basis weight (gsm) | 33 gsm | 30 gsm |
| Bonding pattern | hexadot bonding area: 11% | hexadot bonding area: 11% |
| Elongation in CD | 260% | 184% |
| F @ 10% elongation | 1.15 N/5 cm | 7.05 N/5 cm |
| permanent set | 13% | 29% |

Elongation in CD and tensile strength at 10% elongation was determined according DIN 53857 at a Zwick tensile tester, whereas the permanent set was determined via a hysteresis test according DIN 53835 at a Zwick tensile tester. From Table 1 it will be clear that the fabric in accordance with the present invention (Example 1) displays much more attractive elongation and resilience properties when compared with the fabric which falls outside the scope of the present invention (Example 2).

The invention claimed is:

1. An elastic nonwoven fabric comprising a nonwoven web that is made of a plurality of fibers, which fibers are bicomponent fibers which each comprise a first component and a second component, wherein the first component is present in an amount in the range of from 80-95% by weight and the second component is present in an amount in the range of from 5-20% by weight, both weights based on the total weight of each fiber; wherein the first component comprises an ethylene/α-olefin copolymer and the second component comprises a low density polyethylene having a density in the range of from 0.93-0.95 g/cm$^3$ (as determined with ASTM D792); wherein in the ethylene/α-olefin copolymer the amount of α-olefin present is in the range of from 2-70 mole %, based on the total copolymer; wherein the bicomponent fibers have a core-sheath structure in which the core part comprises the first component and the sheath part comprises the second component; wherein the first component and the second component both have a melt flow rate in the range of from 10-40 g/10 min (as determined with ASTM D1238 (190° C., 2.16 kg)); and wherein the nonwoven web comprises a side which is provided with a pattern of individualized bonded areas, wherein the surface of the bonded areas is in the range of 8-25%, based on the total surface of the side.

2. The nonwoven fabric according to claim 1, wherein the first component comprises an ethylene/α-olefin block copolymer.

3. The nonwoven fabric according to claim 1, wherein both the first component and the second component have a melt flow rate in the range of from 10-30 g/10 min (as determined with ASTM D1238 (190° C., 2.16 kg)).

4. The nonwoven fabric according to claim 1, wherein both the first component and the second component have a melt flow rate in the range of from 10-25 g/10 min (as determined with ASTM D1238 (190° C., 2.16 kg)).

5. The nonwoven fabric according to claim 1, wherein the surface of the bonded areas is in the range of from 8-20%, based on the total surface of the side.

6. The nonwoven fabric according to claim 1, wherein the surface of the bonded areas is in the range of from 8-15%, based on the total surface of the side.

7. The nonwoven fabric according to claim 1, wherein the nonwoven web has a basis weight in the range of from 5-50 g/m$^2$.

8. The nonwoven fabric according to claim 1, wherein the first component is present in an amount in the range of from 83-93% by weight and the second component is present in an amount in the range of from 7-17% by weight, based on the total weight of each fiber.

9. The nonwoven fabric according to claim 1 wherein the ethylene/α-olefin copolymer is a single-site catalyzed copolymer.

10. The nonwoven fabric according to claim 1, wherein the bonded areas have a circle, diamond, rectangle, square, oval, triangle, rod, heart, moon star, hexagonal, octagonal or another polygon shape.

11. A process for preparing an elastic nonwoven fabric comprising the steps of
   (a) providing a first stream of a molten or semi-molten ethylene/α-olefin copolymer;
   (b) providing a second stream of a molten or semi-molten low density polyethylene having a density in the range of from 0.93-0.95 g/cm$^3$ (as determined with ASTM D792), wherein both the ethylene/α-olefin copolymer and the polyethylene have a melt flow rate in the range of from 10-40 g/10 min (as determined with ASTM D1238 (190° C., 2.16 kg));
   (c) forming from the first stream and the second stream a plurality of bicomponent fibers which each comprise a first component comprising the ethylene/α-olefin copolymer and a second component comprising the polyethylene, wherein the first component is present in an amount in the range of from 80-95% by weight and the second component is present in the range of from 5-20% by weight, both weights based on the total weight of each fiber, and wherein the bicomponent fibers have a core-sheath structure in which the cored part comprises the first component and the sheath part comprises the second component;
   (d) forming from the bicomponent fibers as obtained in step (c) a nonwoven web; and
   (e) feeding the nonwoven web formed in step (d) into a nip defined between oppositely positioned first and second rolls, whereby at least one of the rolls has a patterned outside surface to apply a pattern of individualized bonded areas to the nonwoven web, wherein the nonwoven web comprises a side which is provided with the pattern of individualized bonded areas, wherein the surface of the bonded areas is in the range of 8-25% based on the total surface of the side.

12. An article comprising the nonwoven fabric according to claim 1.

13. The absorbent article according to claim 12, wherein the article is an infection control product or a personal care product.

* * * * *